United States Patent
Fujimura (10) Patent No.: US 10,286,944 B2
(45) Date of Patent: May 14, 2019

(54) STEERING COLUMN DEVICE

(71) Applicant: FUJI KIKO Co., Ltd., Shizuoka (JP)

(72) Inventor: Osamu Fujimura, Shizuoka (JP)

(73) Assignee: FUJI KIKO Co., Ltd., Kosai-shi (JP)

( * ) Notice: Subject to any disclaimer, the term of this patent is extended or adjusted under 35 U.S.C. 154(b) by 269 days.

(21) Appl. No.: 15/464,401

(22) Filed: Mar. 21, 2017

(65) Prior Publication Data

US 2017/0274924 A1    Sep. 28, 2017

(30) Foreign Application Priority Data

Mar. 23, 2016  (JP) ................. 2016-058285

(51) Int. Cl.
*B62D 1/184*  (2006.01)
*B62D 1/187*  (2006.01)

(52) U.S. Cl.
CPC ............ *B62D 1/184* (2013.01); *B62D 1/187* (2013.01)

(58) Field of Classification Search
CPC ................. B62D 1/184; B62D 1/187
See application file for complete search history.

(56) References Cited

U.S. PATENT DOCUMENTS

| 4,396,207 A | 8/1983 | Okamoto | |
|---|---|---|---|
| 7,954,852 B2* | 6/2011 | Ueno | B62D 1/16 280/775 |
| 9,545,943 B2* | 1/2017 | Sakuda | B62D 1/185 |
| 9,623,895 B2* | 4/2017 | Johta | B62D 1/195 |
| 9,783,221 B2* | 10/2017 | Sakuda | B62D 1/195 |
| 10,011,293 B2* | 7/2018 | Nagatani | B62D 1/184 |
| 2018/0237052 A1* | 8/2018 | Kurokawa | B62D 1/184 |

FOREIGN PATENT DOCUMENTS

| DE | 3138764 A1 | 7/1982 |
|---|---|---|
| EP | 0179690 A1 | 4/1986 |
| EP | 2674347 A2 | 12/2013 |
| JP | 2007-008184 A | 1/2007 |
| JP | 2013256193 A | 12/2013 |

OTHER PUBLICATIONS

Extended European search report dated Jul. 24, 2017 in the counterpart European patent application.

* cited by examiner

*Primary Examiner* — Paul N Dickson
*Assistant Examiner* — Joselynn Y Sliteris
(74) *Attorney, Agent, or Firm* — Metrolexis Law Group, PLLC (57) ABSTRACT

On the outer peripheral surface of a part of a tilt operation shaft between sidewalls of a steering column, a pair of left and right protrusions are disposed opposite to each other which protrude outward in the radial direction. The pair of protrusions include mutually facing side surfaces formed as slanted parts defining a truncated V shape in a plan view such that the slanted parts get closer to each other as extending in the circumferential direction of the tilt operation shaft. When the tilt operation shaft is rotated, parts of a spring come into contact with the slanted parts of the protrusions and become elastically deformed, thereby pulling hold end parts of the spring out of tilt holes in wall surface parts of a tilt bracket.

2 Claims, 7 Drawing Sheets

STEERING COLUMN DEVICE

CROSS REFERENCE TO RELATED APPLICATION

This application claims the benefit of priority from Japanese Patent Application No. 2016-058285, filed on Mar. 23, 2016, the entire contents of which are incorporated herein by reference.

TECHNICAL FIELD

The present invention relates to a steering column device having a tilt function.

BACKGROUND ART

Heretofore, a steering column device has been known which makes a steering column swingable in a tilt direction (vehicle vertical direction) (see Japanese Patent Application Publication No. 2013-256193). In the steering column device in Japanese Patent Application Publication No. 2013-256193, a tilt bracket is fixed to a vehicle body through an attachment stay and attachment bodies, and the steering column is arranged inside the tilt bracket. Specifically, the tilt bracket includes a coupling plate forming an upper surface and a pair of side plates extending downward from the left and right ends of the coupling plate and, with the coupling plate and the pair of side plates, is formed in a U-shape in cross section opening at the lower side.

In Japanese Patent Application Publication No. 2013-256193, a plurality of friction plates are disposed on the outer side of one of the side plates of the tilt bracket, and that side plate and the friction plates are fastened to each other with a locking mechanism so that the steering column can be held (locked) from moving in the tilt direction from a given height position.

However, since a plurality of friction plates are arranged, the steering column device described in Japanese Patent Application Publication No. 2013-256193 has a problem that the number of components is increased and the assemblability is lowered.

SUMMARY OF THE INVENTION

Thus in view of the above circumstance, an object of the present invention is to provide a steering column device with fewer components and higher assemblability.

A steering column device according to the present invention includes: a pair of left and right sidewalls which extend downward from a lower part of a steering column and in each of which are formed a tilt-operation-shaft holding hole capable of holding an tilt operation shaft and a spring insertion hole capable of letting a hold end part of a spring inserted thereinto; a tilt bracket which includes wall surface parts disposed on an outer side of the sidewalls of the steering column in a vehicle width direction, the wall surface parts each including a tilt slot extending in a vertical direction and being capable of letting the tilt operation shaft 63 inserted thereinto, and a plurality of tilt holes spaced from each other in the vertical direction and being capable of holding the hold end part of the spring; the tilt operation shaft, which extends in the vehicle width direction through the tilt-operation-shaft holding holes in the sidewalls of the steering column and the tilt slots in the wall surface parts of the tilt bracket; and the spring, which is elastically deformable, is held around an outer peripheral surface of the tilt operation shaft with left and right end parts thereof inserted into the spring insertion holes in the sidewalls of the steering column and ones of the tilt holes in the wall surface parts of the tilt bracket, and is formed in a hat shape in a front view. On an outer peripheral surface of a part of the tilt operation shaft between the sidewalls of the steering column, a pair of left and right protrusions are disposed opposite to each other which protrude outward in a radial direction, the pair of protrusions include mutually facing side surfaces formed as slanted parts defining a truncated V shape in a plan view such that the slanted parts get closer to each other as extending in a circumferential direction of the tilt operation shaft, and when the tilt operation shaft is rotated, parts of the spring come into contact with the slanted parts of the protrusions and become elastically deformed, thereby pulling the hold end parts of the spring out of the tilt holes in the wall surface parts of the tilt bracket.

In the steering column device according to the present invention, the tilt mechanism mainly includes the spring and the protrusions. This eliminates the need for arranging a plurality of friction plates as in the conventional practice. Thus, a steering column device with fewer components and higher assemblability can be obtained.

DESCRIPTION OF EMBODIMENTS

An embodiment of the present invention will be described below with reference to the drawings. Note that, in the drawings, a vehicle right side is denoted by RH, a vehicle left side is denoted by LH, a vehicle front side is denoted by FR, a vehicle rear side is denoted by RR, a vehicle upper side is denoted by UPR, and a vehicle lower side is denoted by LWR.

Figure 1:
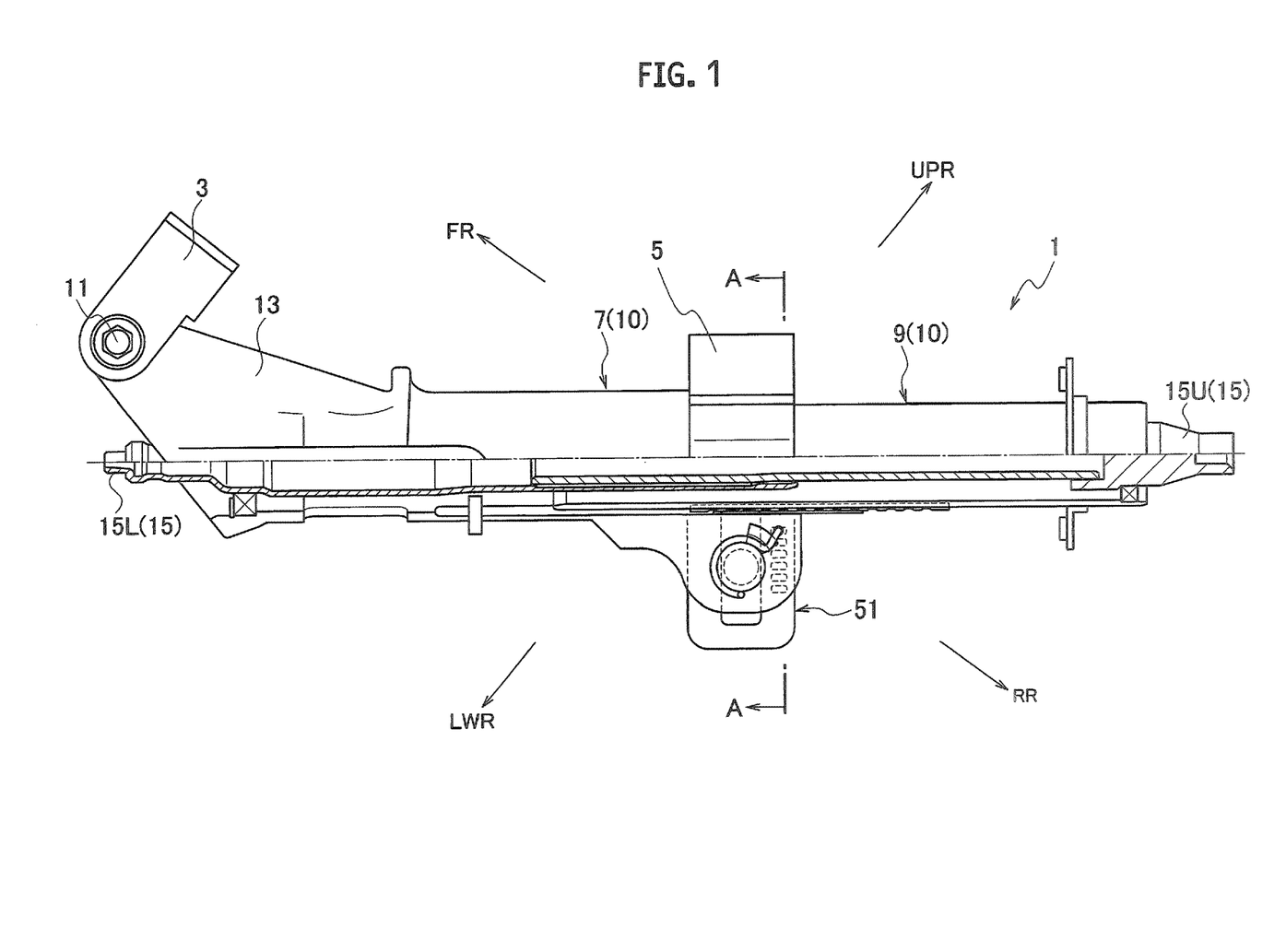
FIG. 1 is a side view of a steering column device according to an embodiment of the present invention as seen from a vehicle left side.
Figure 2:
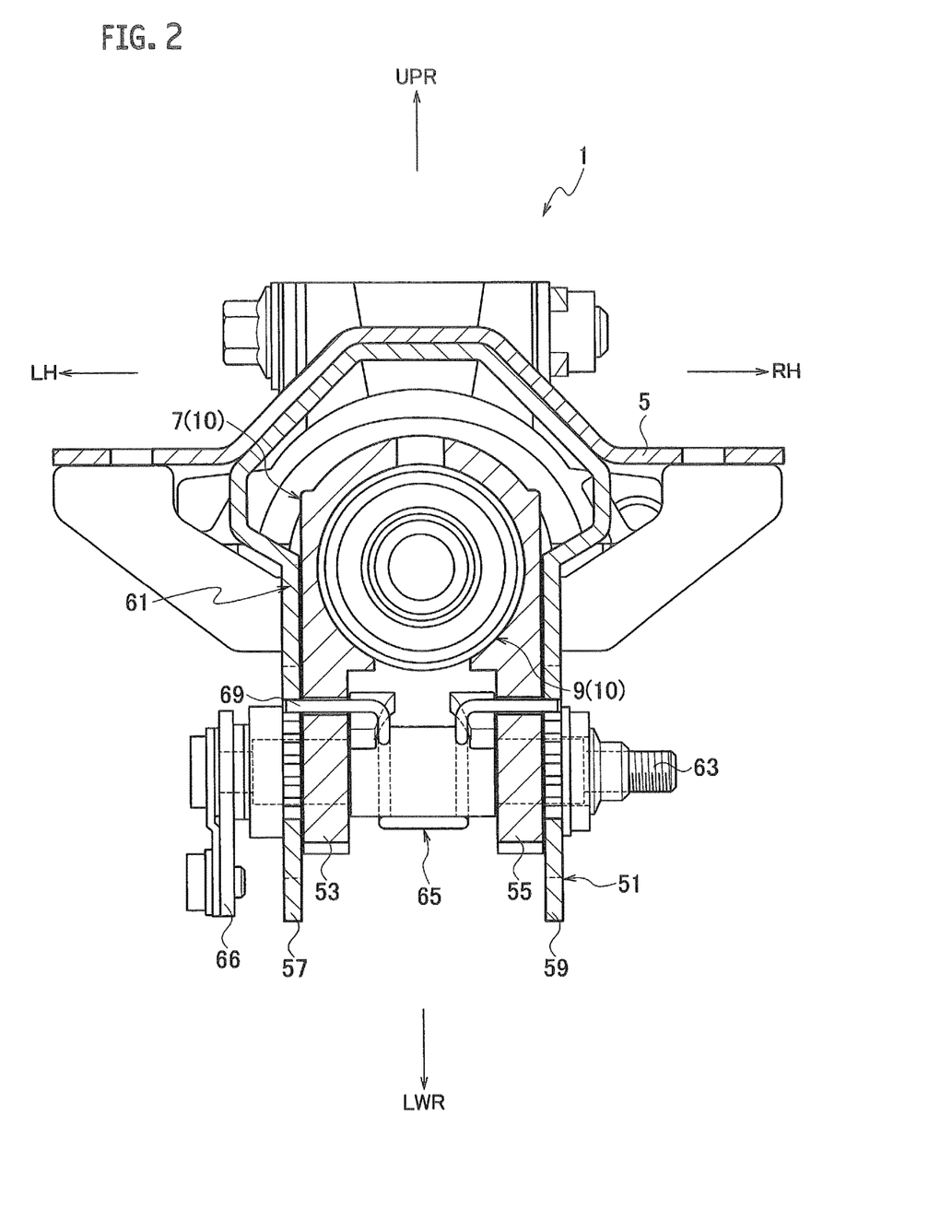
FIG. 2 is a cross-sectional view taken along line A-A in FIG. 1.

As illustrated in FIGS. 1 to 2, a steering column device according to this embodiment is a manual-type steering column device 1. Also, the steering column device 1 includes: a front attachment bracket 3 and a center attachment bracket 5 to be fixed to a vehicle body; an outer column 7 supported to the front attachment bracket 3 and the center attachment bracket 5 and configured to be swingable in the vehicle vertical direction (tilt direction) (capable of adjusting its tilt position); an inner column 9 supported to the outer column 7; and a tilt mechanism 51 holding the outer column 7 and the inner column 9 such that can be swung in the vehicle vertical direction (tilt direction) (capable of adjusting the tilt direction). Note that the outer column 7 is disposed on a vehicle lower side, the inner column 9 is disposed on a vehicle upper side relative to the outer column 7, and the inner column 9 is inserted inside the inner periphery of the outer column 7. These outer column 7 and inner column 9 constitute a steering column 10. The front attachment bracket 3 includes a pivot part 11 configured to pivotally support the outer column 7 such that the outer column 7 can be swung. The tilt mechanism 51 is arranged on the lower end of the center attachment bracket 5.

The outer column 7 has a tubular shape and is arranged along the vehicle longitudinal direction and the vehicle vertical direction. The outer column 7 includes a pivotally supported part 13 at its front end part. With the pivotally supported part 13 pivotally supported on the pivot part 11 of the front attachment bracket 3, the outer column 7 and the inner column 9 can be swung about the pivot part 11 in the vehicle vertical direction.

The inner column 9 has a tubular shape and is inserted in the tube of the outer column 7 in such a way as to be movable in the axial direction. Note that a steering shaft 15 is rotatably supported in the tubes of the inner column 9 and the outer column 7. The steering shaft 15 includes a lower shaft 15L rotatably supported in the outer column 7 and an upper shaft 15U rotatably supported in the inner column 9. The upper shaft 15U and the lower shaft 15L are coupled to each other with a spline(s). Thus, the upper shaft 15U and the lower shaft 15L can rotate together about an axis, and the upper shaft 15U can move relative to the lower shaft 15L in the direction of the axis.

As illustrated in FIGS. 2 to 6, the tilt mechanism 51 according to this embodiment includes: a pair of left and right sidewalls 53 and 55 extending downward from a lower part the outer column 7, which constitutes the steering column 10; a tilt bracket 61 including a pair of left and right wall surface parts 57 and 59 disposed on the outer side of the sidewalls 53 and 55 of the steering column 10 in the vehicle width direction; a tilt operation shaft 63 extending in the vehicle width direction through the sidewalls 53 and 55 of the steering column 10 (outer column 7) and the wall surface parts 57 and 59 of the tilt bracket 61; an elastically deformable spring 65 held around the outer peripheral surface of the tilt operation shaft 63; and an operation handle 66 configured to rotate in synchronization with the tilt operation shaft 63.

Circular tilt-operation-shaft holding holes 67 capable of holding the tilt operation shaft 63 and circular spring insertion holes 71 capable of letting hold end parts 69 of the spring 65 inserted thereinto are formed in lower end parts of the sidewalls 53 and 55 of the outer column 7. The tilt-operation-shaft holding holes 67 and the spring insertion holes 71 are formed through the sidewalls 53 and 55.

The tilt bracket 61 is provided with the wall surface parts 57 and 59 at its lower end parts. In each of the wall surface parts 57 and 59 are formed a tilt slot 73 extending in the vertical direction and being capable of letting the tilt operation shaft 63 inserted thereinto, and a plurality of tilt holes 75 spaced from each other in the vertical direction and capable of holding the hold end part 69 of the spring 65. Specifically, in a side view, the tilt slot 73 is formed in a rectangular shape longer in the vertical direction, and each of the tilt holes 75 is formed in a small rectangular shape longer sideways. Note that in this embodiment, the tilt holes 75 are provided at six spots along the vertical direction, and the height of the steering column can thus be adjusted to six different levels.

The tilt operation shaft 63 is a cylindrical member extending in the vehicle width direction. Specifically, the tilt operation shaft 63 includes a large-diameter part 77 and small-diameter parts 79 formed integrally with each other. The large-diameter part 77 is configured to be disposed between the pair of sidewalls 53 and 55, and the small-diameter parts 79 extend outward in the axial direction from the large-diameter part 77. Further, on opposite end portions of the large-diameter part 77 in the axial direction (vehicle width direction), a pair of left and right protrusions 81 are formed which protrude outward in the radial direction.

Each protrusion 81 is formed as a single body from a supporting base 83 extending outward in the radial direction from the outer peripheral surface of the large-diameter part 77 of the tilt operation shaft 63, and a pressing body 85 provided on the tip of the supporting base 83. The pressing body 85 is formed to define a curved surface extending along the outer peripheral surface of the large-diameter part 77. The mutually facing side surfaces of the pressing bodies 85 of this pair of protrusions 81 are formed as slanted parts 87 extending obliquely in a truncated V-shape in a plan view such that they get closer to each other as extending in the circumferential direction of the tilt operation shaft 63. Each of these slanted parts 87 includes, at its circumferential ends, one end 89 and the other end 91 in the circumferential direction of the tilt operation shaft 63, and extends obliquely in the plan view from the one end 89 and the other end 91. Thus, the distance between the one ends 89 in the axial direction is set to be longer than the distance between the other ends 91, and the distance between the slanted parts 87 becomes gradually shorter from the one ends 89 toward the other ends 91.

The spring 65 is held around the outer peripheral surface of the tilt operation shaft 63 with the left and right hold end parts 69 inserted in the spring insertion holes 71 in the sidewalls 53 and 55 of the steering column and some of the tilt holes 75 in the wall surface parts 57 and 59 of the tilt bracket 61. Meanwhile, the spring 65 is formed in a hat shape in a front view to be elastically deformable.

Specifically, the spring 65 is formed as a single body in a hat shape in a front view with: a base part 93 extending in the axial direction of the tilt operation shaft 63 (vehicle width direction); curved parts 95 extending from the left and right ends of the base part 93 in a semicircular shape along the circumferential direction of the tilt operation shaft 63; leg parts 97 extending upright from the tips of the curved parts 95 outwardly in the radial direction of the tilt operation shaft 63; and the hold end parts 69, extending away from each other from the tips of the leg parts 97 along the axial direction of the tilt operation shaft 63.

Next, description will be given of an operation in which the tilt operation shaft 63 is rotated to move the hold end parts 69 of the spring 65 in the vehicle width direction.

[Locked State]

Figure 3:
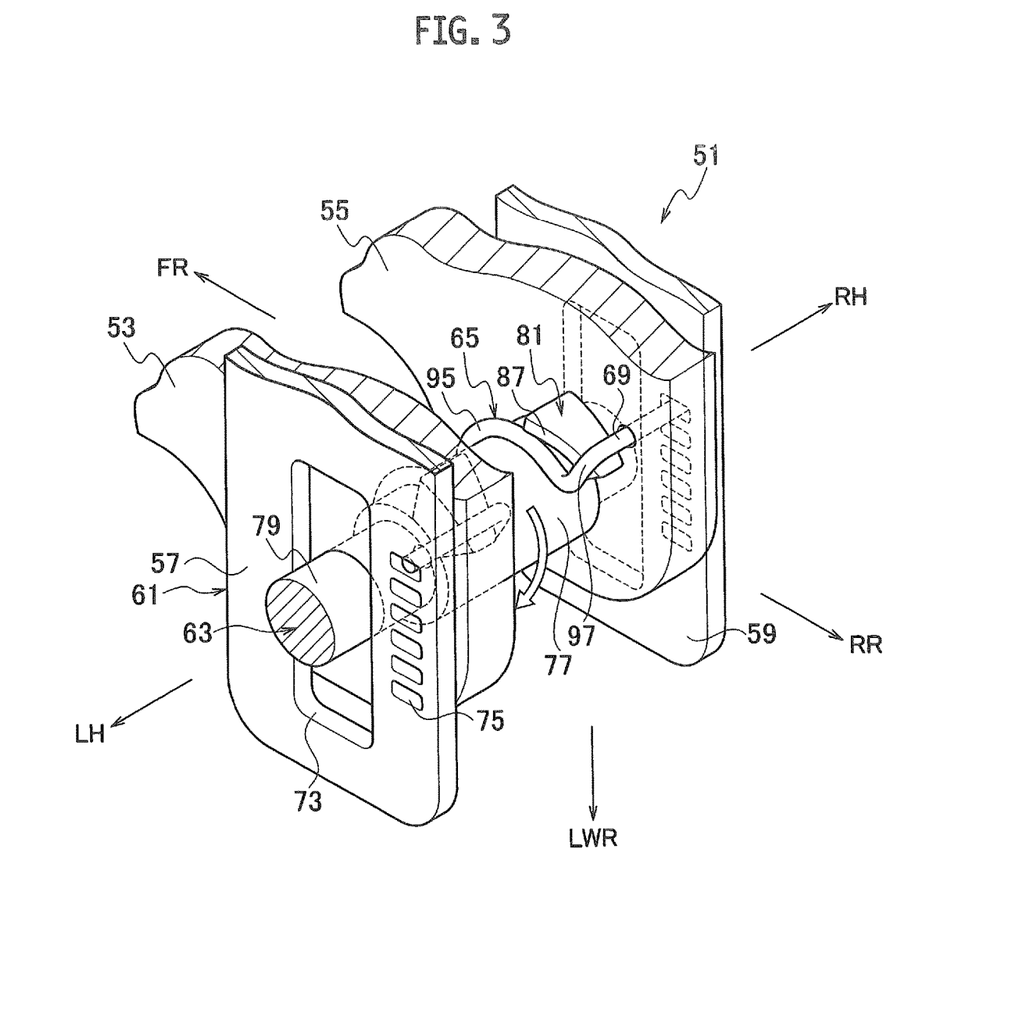
FIG. 3 is a perspective view illustrating a tilt mechanism of the steering column device according to the embodiment of the present invention.
Figure 5:
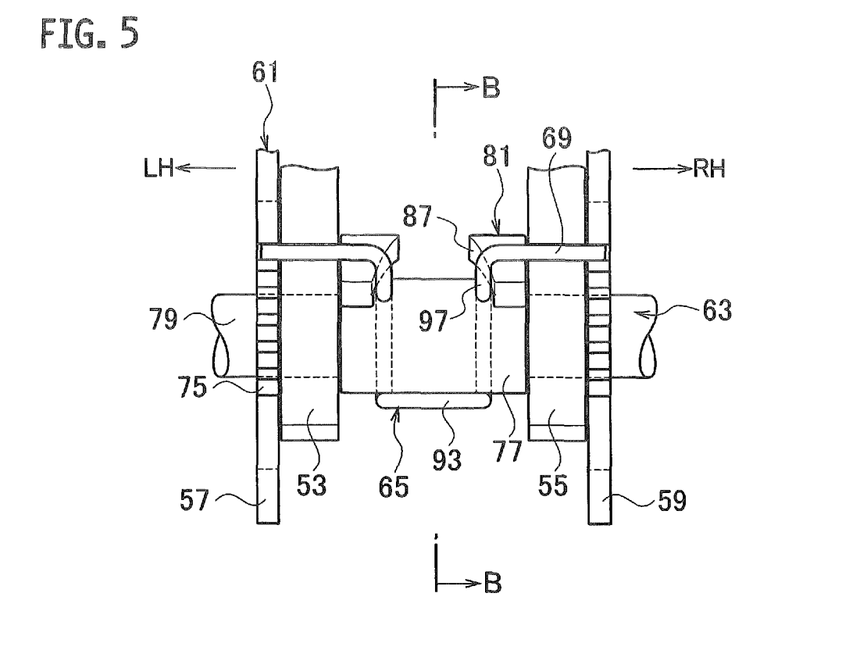
FIG. 5 is a back view of the tilt mechanism in FIG. 3 as seen from a vehicle rear side toward a vehicle front side.
Figure 6:
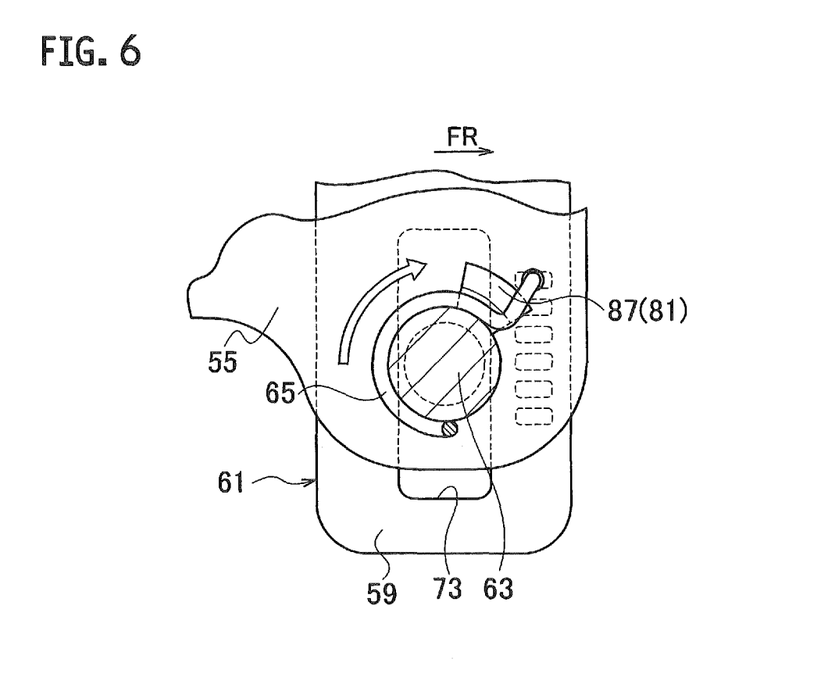
FIG. 6 is a cross-sectional view taken along line B-B in FIG. 5.
Figure 7:
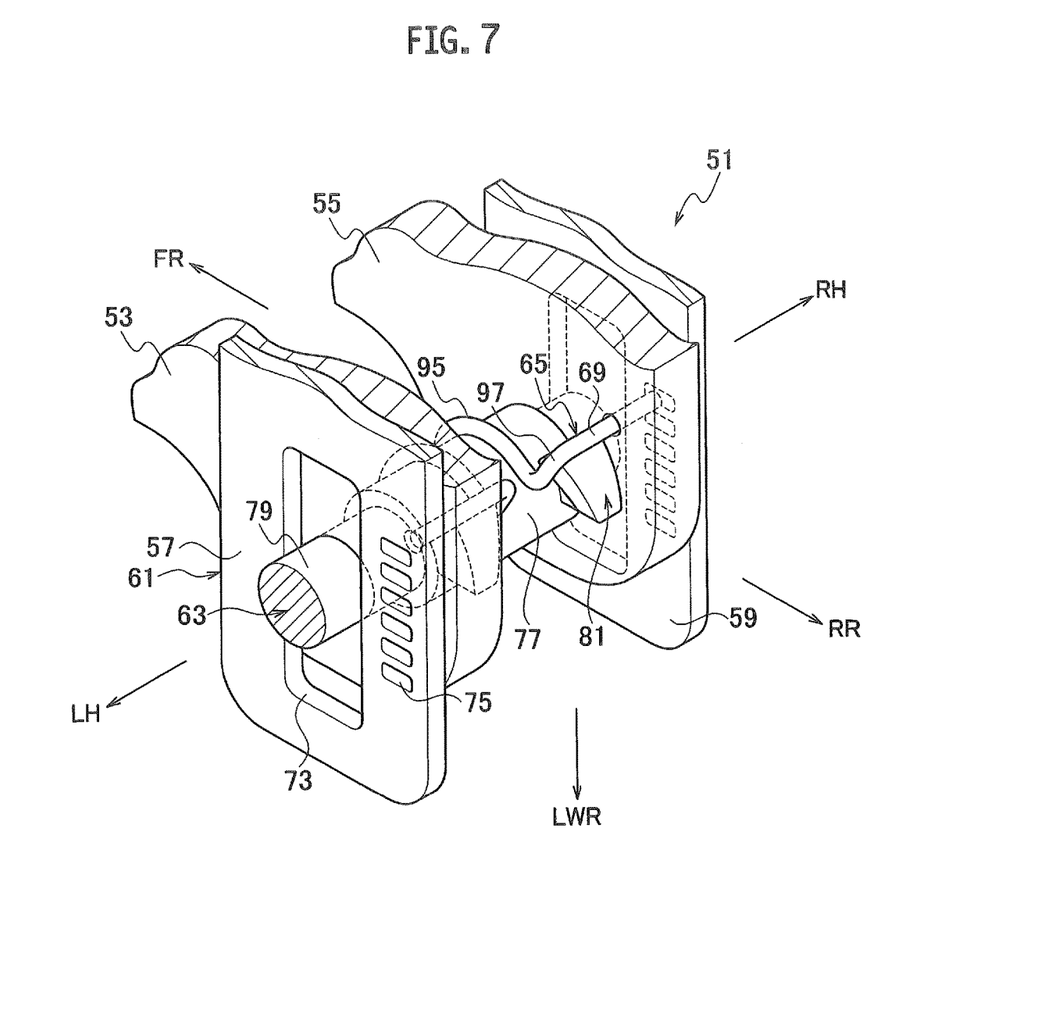
FIG. 7 is a perspective view of the tilt mechanism in FIG. 3 illustrating a state where a tilt operation shaft is rotated from the state in FIG. 3 in the direction of the outlined arrow in FIG. 3.
Figure 8:
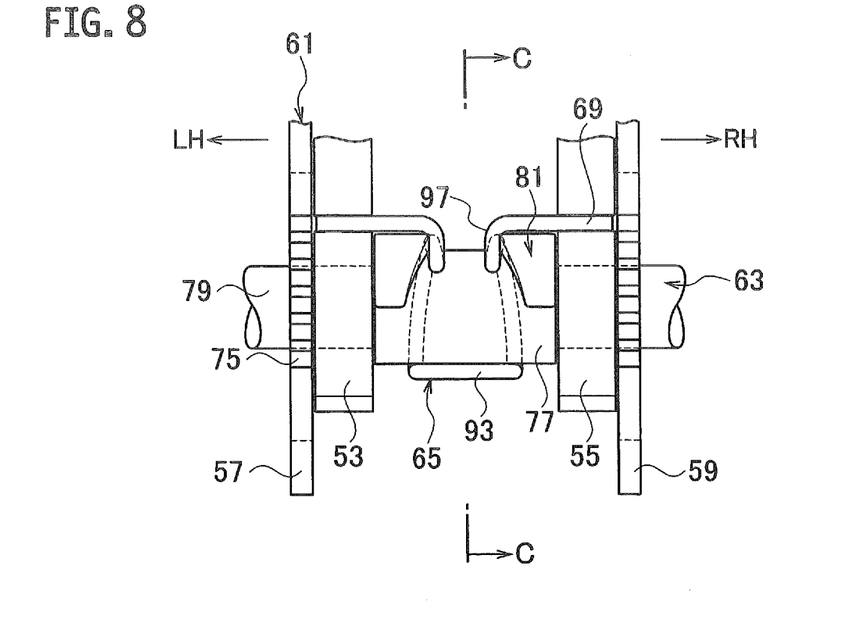
FIG. 8 is a back view of the tilt mechanism in FIG. 7 as seen from the vehicle rear side toward the vehicle front side.
Figure 9:
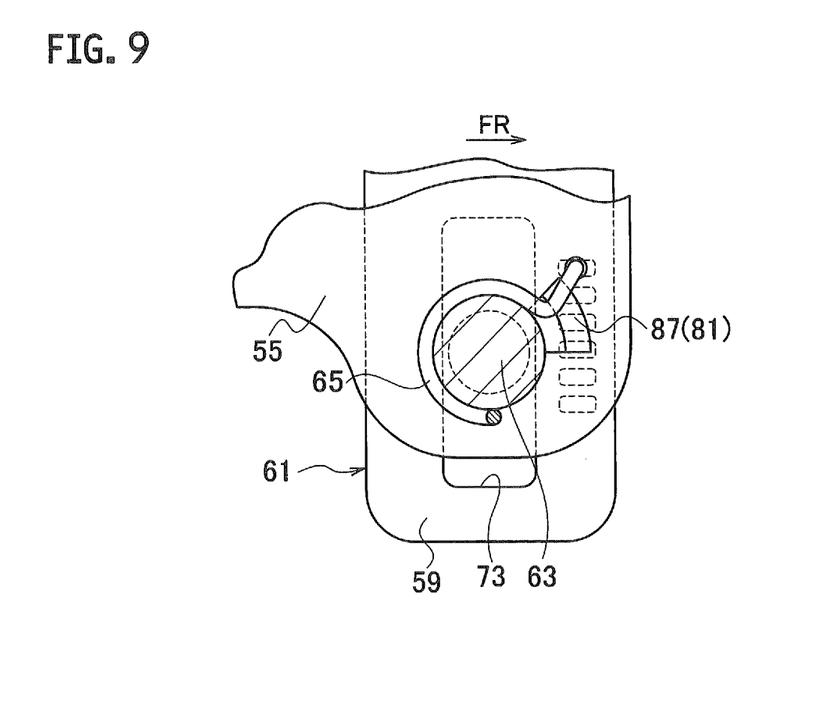
FIG. 9 is a cross-sectional view taken along line C-C in FIG. 8.

As illustrated in FIGS. 3, 5, and 6, in a locked state, the tip of the hold end parts 69 of the spring 65 are inserted in some of the tilt holes 75 in the wall surface parts 57 and 59 of the tilt bracket 61. Hence, the vertical position of the steering column 10 is held (locked) at the height of the given tilt holes 75. In this state, the leg parts 97 of the spring 65 are disposed opposite to each other and close to the one ends 89 of the slanted parts 87 of the protrusions 81.

[Unlocked State]

Figure 4:
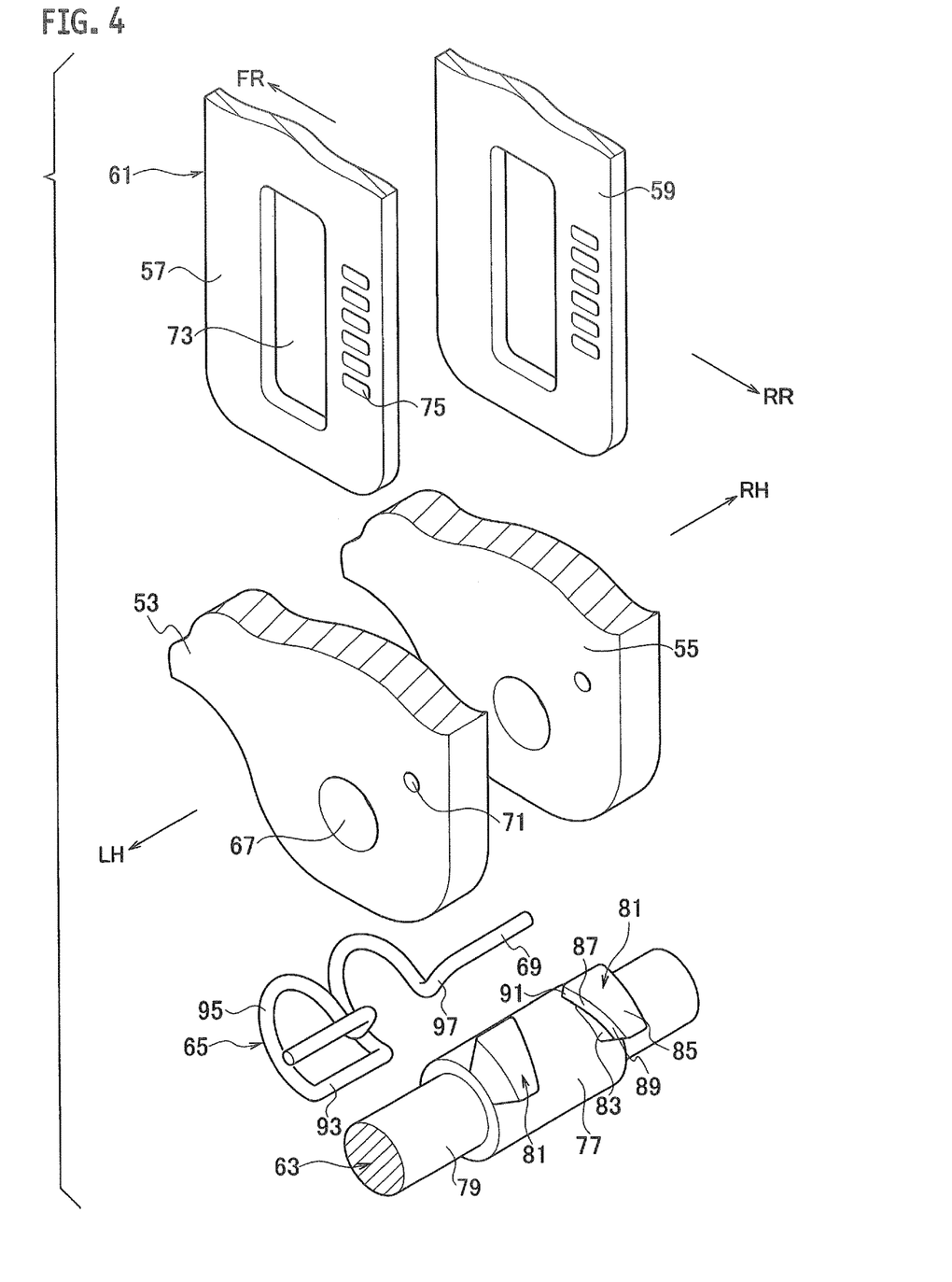
FIG. 4 is an exploded perspective view of FIG. 3.

Then, when the tilt operation shaft 63 is rotated along the outlined arrows in FIGS. 3 and 6, the left and right leg parts 97 of the spring 65 are pressed against the slanted parts 87 of the protrusions 81, so that the leg parts 97 are elastically deformed to get closer to each other and the hold end parts 69 of the spring 65 are pulled out of the tilt holes 75 in the wall surface parts 57 and 59 of the tilt bracket 61. The hold end parts 69 of the spring 65 are then held within the spring insertion holes 71 in the sidewalls 53 and 55. Specifically, the contacting portions of the leg parts 97 of the spring 65 shift gradually from the one ends 89 to the other ends 91 of the slanted parts 87 of the protrusions 81, which are illustrated in FIG. 4. As the tilt operation shaft 63 is rotated, the distance between the slanted parts 87 of the pair of left and right protrusions 81 becomes gradually shorter, so that the distance between the leg parts 97 of the spring 65 becomes shorter as well. Once the hold end parts 69 of the spring 65 are pulled out of the tilt holes 75 in the wall surface parts 57 and 59 of the tilt bracket 61, that state is an unlocked state in which the tilt operation shaft 63 can be freely vertically moved within the tilt slots 73. In this unlocked state, the vertical position of the steering column can be moved. Moreover, in the unlocked state, the spring 65 is held on the outer peripheral surface of the tilt operation shaft 63 and in the spring insertion holes 71 in the sidewalls 53 and 55.

Here, after the hold end parts 69 of the spring 65 are pulled out of the tilt holes 75 in the wall surface parts 57 and 59 of the tilt bracket 61, the steering column 10 can be moved slightly in the vertical direction such that the tips of the hold end parts 69 come into contact with the wall surface parts 57 and 59 between some tilt holes 75 (the inner side surfaces of the wall surface parts 57 and 59). As a result, the spring 65 is contracted in a locked state in which the steering column 10 can be slid in the vertical direction. The hold end parts 69 are inserted into some of the tilt holes 75 upon application of vertical force to the steering column 10 in this locked state.

Advantageous Effects by this Embodiment Will be Described Below.

(1) The steering column device according to this embodiment includes: the pair of left and right sidewalls 53 and 55 which extend downward from a lower part of the steering column 10 and in each of which are formed the tilt-operation-shaft holding hole 67 capable of holding the tilt operation shaft 63 and the spring insertion hole 71 capable of letting the hold end part 69 of the spring 65 inserted thereinto; the tilt bracket 61 which includes the wall surface parts 57 and 59 disposed on the outer side of the sidewalls 53 and 55 of the steering column in the vehicle width direction, the wall surface parts 57 and 59 each including the tilt slot 73 extending in the vertical direction and being capable of letting the tilt operation shaft 63 inserted thereinto, and the plurality of tilt holes 75 spaced from each other in the vertical direction and being capable of holding the hold end part 69 of the spring 65; the tilt operation shaft 63, which extends in the vehicle width direction through the tilt-operation-shaft holding holes 67 in the sidewalls 53 and 55 of the steering column and the tilt slots 73 in the wall surface parts 57 and 59 of the tilt bracket 61; and the spring 65, which is elastically deformable, is held around the outer peripheral surface of the tilt operation shaft 63, includes left and right end parts thereof insertable into the spring insertion holes 71 in the sidewalls 53 and 55 of the steering column and ones of the tilt holes 75 in the wall surface parts 57 and 59 of the tilt bracket 61, and is formed in a hat shape in a front view.

On the outer peripheral surface of a part of the tilt operation shaft 63 between the sidewalls 53 and 55 of the steering column, the pair of left and right protrusions 81 are disposed opposite to each other which protrude outward in the radial direction. The pair of protrusions 81 include mutually facing side surfaces formed as the slanted parts 87 defining a truncated V-shape in a plan view such that the slanted parts 87 get closer to each other as extending in the circumferential direction of the tilt operation shaft 63. When the tilt operation shaft 63 is rotated, the leg parts 97 (parts) of the spring 65 come into contact with the slanted parts 87 of the protrusions 81 and become elastically deformed, thereby pulling the hold end parts 69 of the spring 65 out of the tilt holes 75 in the wall surface parts 57 and 59 of the tilt bracket 61.

As described above, the tilt mechanism 51 mainly includes the spring 65 and the protrusions 81. This eliminates the need for arranging a plurality of friction plates as in the conventional practice. Thus, a steering column device with fewer components and higher assemblability can be obtained. Also, in the unlocked state, the spring 65 is held on the outer peripheral surface of the tilt operation shaft 63 and in the spring insertion holes 71 in the sidewalls 53 and 55. Thus, the spring 65 can be reliably held even in the unlocked state. Further, even in the locked state in which the hold end parts 69 of the spring 65 come into contact with positions between some tilt holes 75 (the inner side surfaces of the wall surface parts 57 and 59), the hold end parts 69 are inserted into some tilt holes 75 upon application of vertical force to the steering column 10. Thus, the steering column 10 can be reliably held from moving in the tilt direction.

(2) The tilt operation shaft 63 is a cylindrical body extending in the vehicle width direction. The spring 65 is formed as a single body in a hat shape in a front view with: the base part 93 extending in the axial direction of the tilt operation shaft 63; the curved parts 95 extending from the left and right ends of the base part 93 along the circumferential direction of the tilt operation shaft 63; the leg parts 97 extending upright from the tips of the curved parts 95 outwardly in the radial direction of the tilt operation shaft 63; and the hold end parts 69, extending away from each other from the tips of the leg parts 97 along the axial direction of the tilt operation shaft 63. When the tilt operation shaft 63 is rotated, the leg parts 97 of the spring 65 come into contact with the slanted parts 87 of the protrusions 81 and become elastically deformed to get closer to each other, thereby pulling the hold end parts 69 of the spring 65 out of the tilt holes 75 in the wall surface parts 57 and 59 of the tilt bracket 61.

As described above, the leg parts 97 of the spring 65 come into contact with the slanted parts 87 of the protrusion 81 and the leg parts 97 get closer to each other. Thus, the hold end parts 69 of the spring 65 can be reliably pulled out of the tilt holes 75 in the wall surface parts 57 and 59 of the tilt bracket 61.

It is to be noted that the present is not limited to the above-described embodiment but various changes and the like can be made thereto.

The invention claimed is:

1. A steering column device comprising:
a pair of left and right sidewalls which extend downward from a lower part of a steering column and in each of which are formed a tilt-operation-shaft holding hole capable of holding a tilt operation shaft and a spring insertion hole capable of letting a hold end part of a spring inserted thereinto;

a tilt bracket which includes wall surface parts disposed on an outer side of the sidewalls of the steering column in a vehicle width direction, the wall surface parts each including a tilt slot extending in a vertical direction and being capable of letting the tilt operation shaft inserted thereinto, and a plurality of tilt holes spaced from each other in the vertical direction and being capable of holding the hold end part of the spring;

the tilt operation shaft, which extends in the vehicle width direction through the tilt-operation-shaft holding holes in the sidewalls of the steering column and the tilt slots in the wall surface parts of the tilt bracket; and the spring, which is elastically deformable, is held around an outer peripheral surface of the tilt operation shaft with left and right end parts thereof inserted into the spring insertion holes in the sidewalls of the steering column and ones of the tilt holes in the wall surface parts of the tilt bracket, and is formed in a hat shape in a front view, wherein, on an outer peripheral surface of a part of the tilt operation shaft between the sidewalls of the steering column, a pair of left and right protrusions are disposed opposite to each other which protrude outward in a radial direction, the pair of protrusions include mutually facing side surfaces formed as slanted parts defining a truncated V shape in a plan view such that the slanted parts get closer to each other as extending in a circumferential direction of the tilt operation shaft, and when the tilt operation shaft is rotated, parts of the spring come into contact with the slanted parts of the protrusions and become elastically deformed, thereby pulling the hold end parts of the spring out of the tilt holes in the wall surface parts of the tilt bracket.

2. The steering column device according to claim 1, wherein the tilt operation shaft is a cylindrical body extending in the vehicle width direction, the spring is formed as a single body in a hat shape in a front view with a base part extending in an axial direction of the tilt operation shaft, curved parts extending from left and right ends of the base part along the circumferential direction of the tilt operation shaft, leg parts extending upright from tips of the curved parts outwardly in the radial direction of the tilt operation shaft, and the hold end parts, extending away from each other from tips of the leg parts along the axial direction of the tilt operation shaft, and when the tilt operation shaft is rotated, the leg parts of the spring come into contact with the slanted parts of the protrusions and become elastically deformed to get closer to each other, thereby pulling the hold end parts of the spring out of the tilt holes in the wall surface parts of the tilt bracket.

* * * * *